United States Patent
Heydari et al.

(10) Patent No.: US 7,430,082 B2
(45) Date of Patent: Sep. 30, 2008

(54) CIRCUIT AND METHOD FOR DEMODULATING A SERVO POSITION BURST

(75) Inventors: Fereidoon Heydari, Cupertino, CA (US); Hakan Ozdemir, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 322 days.

(21) Appl. No.: 09/993,986

(22) Filed: Nov. 5, 2001

(65) Prior Publication Data

US 2003/0026016 A1   Feb. 6, 2003

Related U.S. Application Data (60) Provisional application No. 60/301,489, filed on Jun. 28, 2001.

(51) Int. Cl.
 *G11B 5/02* (2006.01)
 *G11B 5/596* (2006.01)
(52) U.S. Cl. .................... 360/29; 360/77.08
(58) Field of Classification Search ........... 360/77.08, 360/39, 29, 31, 53, 75, 77.02
 See application file for complete search history.

(56) References Cited

U.S. PATENT DOCUMENTS

| | | | |
|---|---|---|---|
| 5,375,145 A | 12/1994 | Abbott et al. | |
| 5,381,359 A | 1/1995 | Abbott et al. | |
| 5,384,671 A | 1/1995 | Fisher | |
| 5,576,904 A | 11/1996 | Behrens | |
| 5,661,760 A | 8/1997 | Patapoutian et al. | |
| 5,796,535 A | 8/1998 | Tuttle et al. | |
| 5,812,336 A | 9/1998 | Spurbeck et al. | |

(Continued)

FOREIGN PATENT DOCUMENTS

EP    0 341 852    11/1989

(Continued)

OTHER PUBLICATIONS

European Search Report for EP 02 25 3882 dated Aug. 28, 2003.

(Continued)

*Primary Examiner*—Joseph Feild
*Assistant Examiner*—Daniell L Negrón
(74) *Attorney, Agent, or Firm*—Lisa K. Jorgenson; Bryan A. Santarelli (57) ABSTRACT

A new technique for Hard Disk Drive (HDD) servo-burst demodulation is provided. A 4-samples per dibit Discrete Fourier Transform (DFT) amplitude estimation is used to calculate the read-head servo-position error signal. Comparatively, the conventional method of burst demodulation—called burst integration—typically uses more than 8 samples/dibit. Consequently, the new 4-samples/dibit DFT burst-demodulation scheme requires fewer samples per dibit than does burst integration, thus reducing the disk space occupied by the burst data while increasing the performance as compared to burst integration. Furthermore, the DFT scheme does not require the samples to be synchronized to any particular points of the servo burst, and can include an averaging algorithm that further improves performance for a given Signal to Noise Ratio (SNR). Moreover, the same sample-clocking circuit that detects the Gray Code servo information can also implement the DFT burst-demodulation scheme to demodulate the servo burst.

52 Claims, 8 Drawing Sheets

U.S. PATENT DOCUMENTS

| | | |
|---|---|---|
| 5,818,659 A | 10/1998 | Cheung et al. |
| 5,862,005 A * | 1/1999 | Leis et al. .................... 360/29 |
| 5,909,336 A | 6/1999 | Schaffner et al. |
| 6,122,117 A | 9/2000 | Aikawa |
| 6,233,715 B1 | 5/2001 | Kuki et al. |
| 2003/0002189 A1 | 1/2003 | Ozdemir |
| 2003/0048560 A1 | 3/2003 | Ozdemir |
| 2003/0048562 A1 | 3/2003 | Heydari et al. |
| 2003/0053245 A1 | 3/2003 | Ozdemir |

FOREIGN PATENT DOCUMENTS

| | | |
|---|---|---|
| WO | WO 99/60566 A | 11/1999 |

OTHER PUBLICATIONS

European Search Report for EP 02 25 3883 dated Aug. 28, 2003.
Partial European Search Report, from European Application No. EP 02 25 3868, dated Apr. 2, 2007.
European Search Report for EP 02 25 3885 mailed Nov. 7, 2006.

* cited by examiner

CIRCUIT AND METHOD FOR DEMODULATING A SERVO POSITION BURST

CROSS-REFERENCE TO RELATED APPLICATIONS

This application is related to U.S. Patent Application Ser. Nos. 60/301,505 entitled "DATA-STORAGE DISK HAVING FEW OR NO SPIN-UP WEDGES AND METHOD FOR WRITING SERVO WEDGES ONTO THE DISK," 60/301,504 entitled "CIRCUIT AND METHOD FOR DETECTING A SERVO WEDGE ON SPIN UP OF A DATA-STORAGE DISK", 60/301,469 entitled "CIRCUIT AND METHOD FOR DETECTING A SPIN-UP WEDGE AND A CORRESPONDING SERVO WEDGE ON SPIN UP OF A DATA-STORAGE DISK", 60/301,506 entitled "A DATA CODE AND METHOD FOR CODING DATA", Ser. No. 09/993,779 entitled "CIRCUIT AND METHOD FOR DETECTING THE PHASE OF A SERVO SIGNAL", 60/301,503 entitled "SERVO CIRCUIT HAVING A SYNCHRONOUS SERVO CHANNEL AND METHOD FOR SYNCHRONOUSLY RECOVERING SERVO DATA", which were filed on the same day as the present application and which are incorporated by reference.

FIELD OF THE INVENTION

The invention is related generally to electronic circuits, and more particularly to a circuit and method for demodulating a read-write-head position burst in a servo wedge without the need for over sampling or synchronization between the sample clock and the servo burst. Such a circuit and method often allows the position bursts to have a higher freqency, thus allowing the bursts to occupy less space on a disk. Furthermore, such a circuit and method often provide more accurate demodulation of the position burst—and thus often allow a more accurate positioning of the read-write head—because their accuracy is unaffected by disk jitter or other events that often degrade the synchronization between the sample clock and the servo signal.

BACKGROUND OF THE INVENTION

As software applications become larger and more data intensive, disk-drive manufacturers are increasing the data-storage capacities of data-storage disks by increasing the disks' data-storage densities (bits/inch). This increase in storage density typically increases the frequency of the read signal from the read-write head of the disk drive that incorporates such a disk.

Unfortunately, as discussed in more detail below in conjunction with FIGS. 1–5, increasing the density of the servo data, and thus increasing the frequency of the servo signal, may cause a disk drive's head-position circuit to improperly position the read-write head over a selected data track. A servo circuit typically heavily over samples or uses fewer synchronized samples of the servo signal to calculate the amplitudes of read-write head position bursts that are stored on the disk. Using these burst amplitudes, the disk drive calculates a head-position error signal, which the head-position circuit uses to position the head over the selected data track. But if the frequency of the servo signal is too high, the servo circuit may be unable to generate enough samples for over sampling or maintain synchronization between the sample clock and the servo burst, and thus may calculate inaccurate values for the burst amplitudes. Consequently, these inaccurate values may cause the disk drive to calculate an erroneous value for the head-position error signal, and thus may cause the head-position circuit to improperly position the head over the selected data track.

Figure 1:
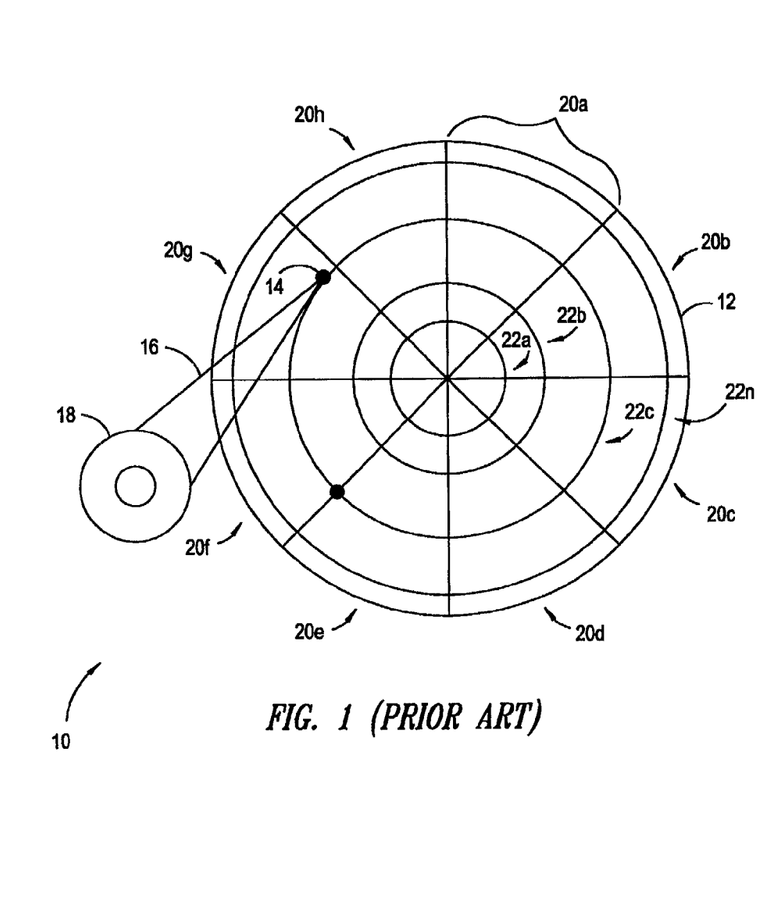
FIG. 1 is a plan view of a conventional disk drive.

FIG. 1 is a plan view of a conventional disk drive 10, which includes a magnetic data-storage disk 12, a read-write head 14, an arm 16, and a voice-coil motor 18. The disk 12 is partitioned into a number—here eight—of disk sectors 20a–20h, and includes a number—typically in the tens or hundreds of thousands—of concentric data tracks 22a–22n. Readable-writable application data is stored in respective data sectors (not shown) within each track 22. Under the control of the disk drive's head-position circuit (not shown in FIG. 1), the motor 18 moves the arm 16 to center the head 14 over a selected track 22.

Figure 2:
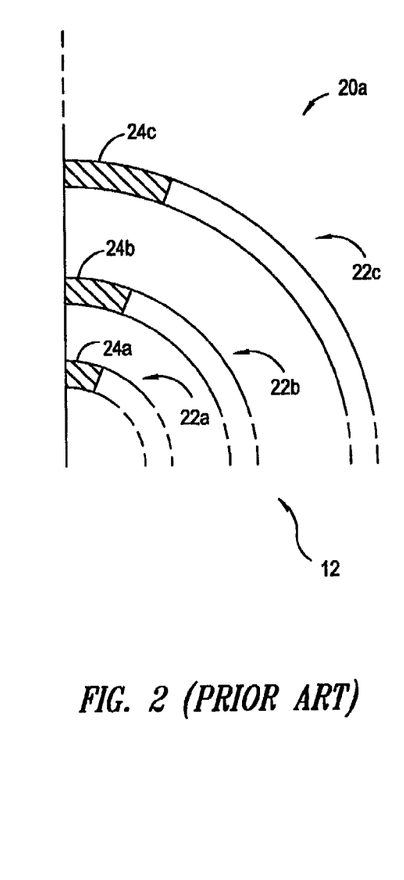
FIG. 2 is a close-up view of some tracks and servo wedges on the disk of FIG. 1.

Referring to FIG. 2, conventional data servo wedges 24—only servo wedges 24a–24c are shown for clarity—include servo data that allows the head-position circuit (not shown in FIG. 2) of the disk drive 10 (FIG. 1) to accurately position the read-write head 14 (FIG. 1) during a data read or write operation. The servo wedges 24 are located within each track 22 at the beginning—the disk 12 spins counterclockwise in this example—of each disk sector 20. Each servo wedge 24 includes respective servo data that indentifies the location (track 22 and sector 20) of the servo wedge. Thus, the head-position circuit uses this servo data to position the head 14 over the track 22 selected to be read from or written to. The manufacturer of the disk drive 10 typically writes the servo wedges 24 onto the disk 12 before shipping the disk drive to a customer; neither the disk drive nor the customer alters the servo wedges 24 thereafter. Servo wedges like the servo wedges 24 are further discussed below in conjunction with FIG. 3 and in commonly owned U.S. patent application Ser. No. 09/783,801, filed Feb. 14, 2001, entitled "VITERBI DETECTOR AND METHOD FOR RECOVERING A BINARY SEQUENCE FROM A READ SIGNAL," which is incorporated by reference.

Figure 3:
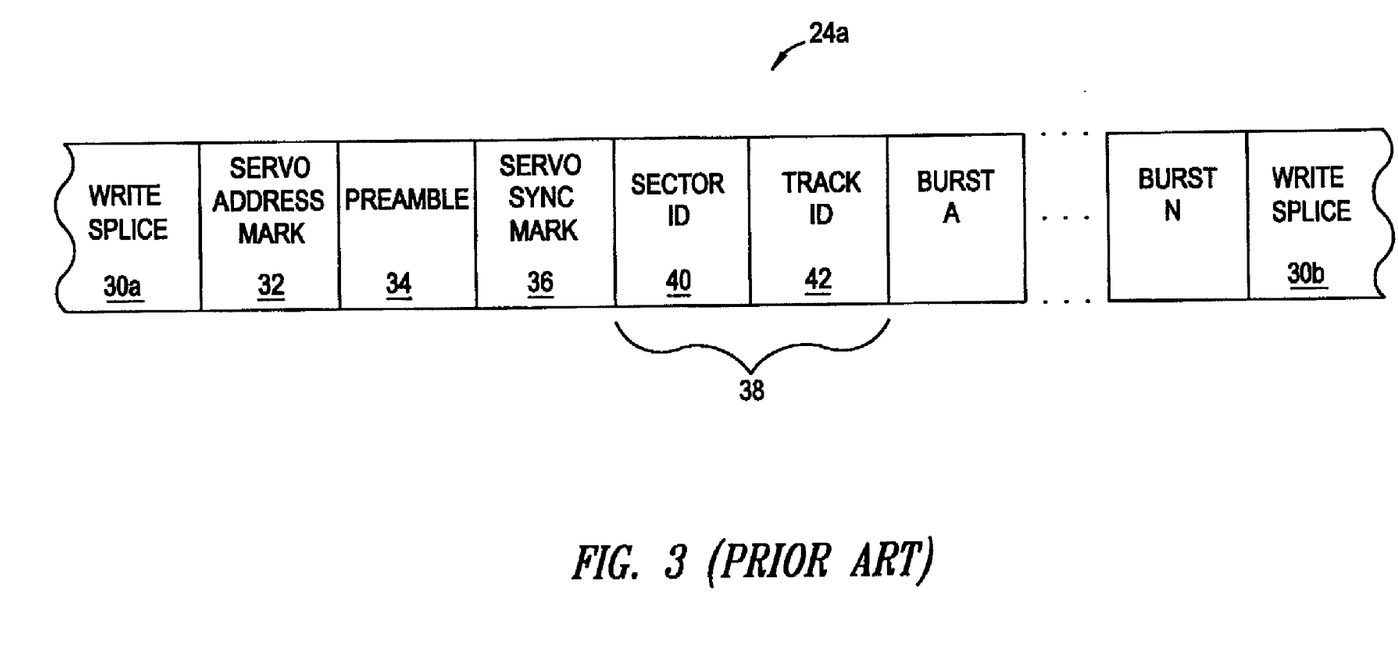
FIG. 3 is a diagram of a servo wedge of FIG. 2.

FIG. 3 is a diagram of the servo wedge 24a of FIG. 2, the other servo wedges 24 being similar. Write splices 30a and 30b respectively separate the servo wedge 24a from adjacent data sectors (not shown). An optional servo address mark (SAM) 32 indicates to the head-position circuit (not shown in FIG. 3) that the read-write head 14 (FIG. 1) is at the beginning of the servo wedge 24a. A servo preamble 34 allows the servo circuit (not shown in FIG. 3) of the disk drive 10 (FIG. 1) to synchronize the sample clock to the servo signal (FIG. 5), and a servo synchronization mark (SSM) 36 identifies the beginning of a head-location identifier 38. Once the beginning of the identifier 38 is identified, a disk-drive controller (FIG. 9) can determine the beginnings of head-position bursts A–N by counting cycles of the sample clock. The preamble 34 and SSM 36 are discussed in commonly owned U.S. patent application Ser. Nos. 60/301,505 entitled "DATA-STORAGE DISK HAVING FEW OR NO SPIN-UP WEDGES AND METHOD FOR WRITING SERVO WEDGES ONTO THE DISK," 60/301,504 entitled "CIRCUIT AND METHOD FOR DETECTING A SERVO WEDGE ON SPIN UP OF A DATA-STORAGE DISK", 60/301,469 entitled "CIRCUIT AND METHOD FOR DETECTING A SPIN-UP WEDGE AND A CORRESPONDING SERVO WEDGE ON SPIN UP OF A DATA-STORAGE DISK", 60/301,503 entitled "SERVO CIRCUIT HAVING A SYNCHRONOUS SERVO CHANNEL AND METHOD FOR SYNCHRONOUSLY RECOVERING SERVO DATA", which are incorporated by reference. The location identifier 38 allows the head-position circuit to coarsely determine and adjust the position of the head 14 with respect to the surface of the disk 12 (FIG. 1). More specifically, the location identifier 38 includes a sector identifier 40 and a track identifier 42, which respectively identify the disk sector 20 and the data track 22—here the sector 20a and the track 22a—that contain the servo wedge 24a. Because the head 14 may read the location identifier 38 even if the head is not centered over the track 24a, the servo wedge 24a also includes the head-position bursts A–N, which allow the head-position circuit to finely determine and adjust the position of the head 14 as discussed below in conjunction with FIGS. 4 and 5.

Figure 4:
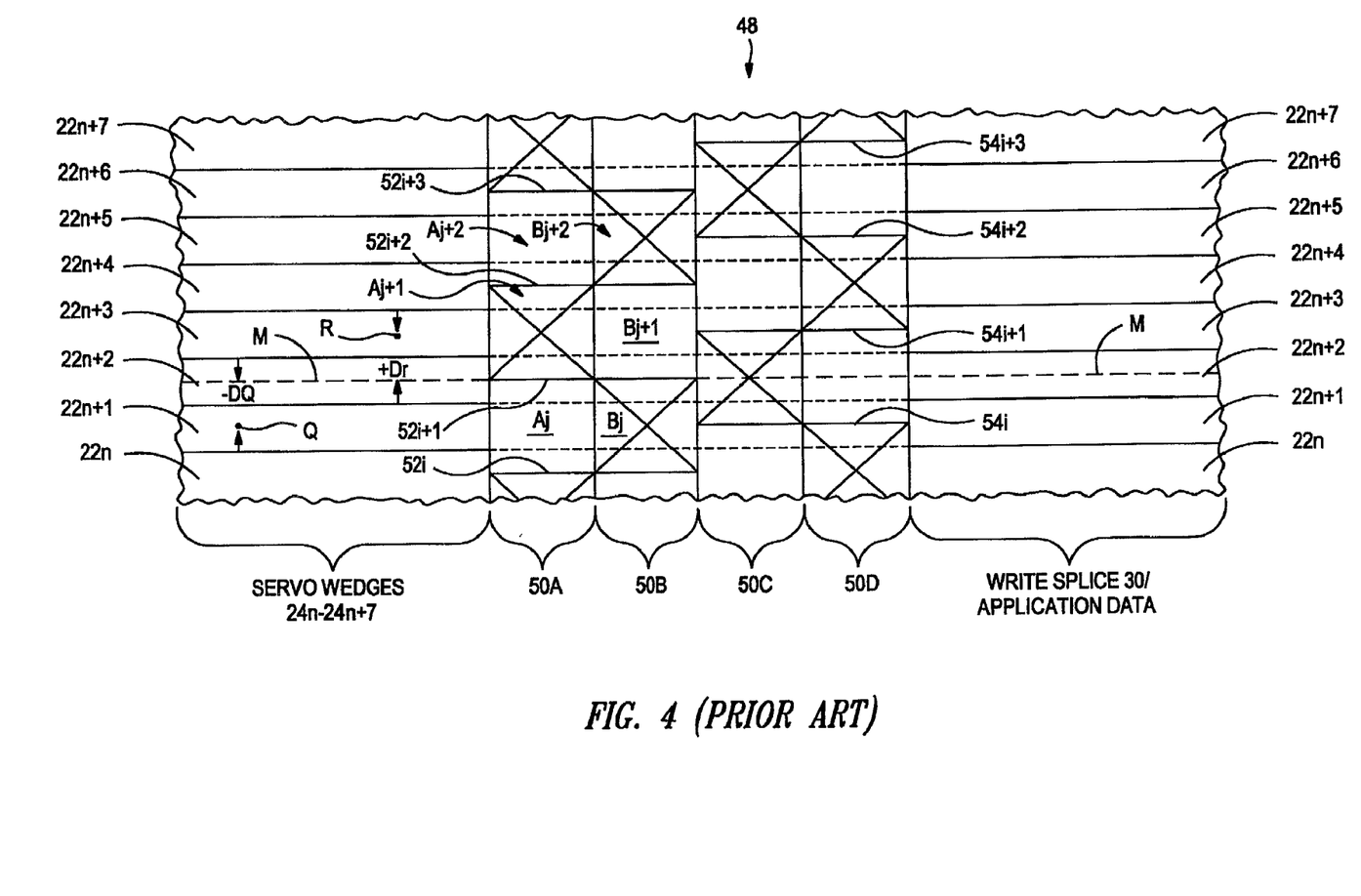
FIG. 4 is a close-up view of some tracks and position bursts on the disk of FIG. 1.

FIG. 4 is a close-up view of a portion 48 of the disk 10 (FIG. 1), the portion 48 including four sections 50A–50D of head-position bursts A–D, respectively. More specifically, the portion 48 includes adjacent tracks $22_n$–$22_{n+7}$, the illustrated portions of which include the servo wedges 24 (FIG. 3), burst sections 50A–50D, and write splices 30 and/or application data. Each of the bursts in sections 50A–50D is two tracks wide in a radial direction and is staggered with respect to the tracks 22 such that the boundaries 52 and 54 between adjacent bursts in the same section are aligned with the centers of respective tracks 22. For example, the boundary $52_{i+1}$ between adjacent bursts $A_j$ and $A_{j+1}$ and $B_j$ and $B_{j+1}$, is aligned with the center of the track $22_{n+2}$. Furthermore, the bursts in each section 50A–50D alternate between a logic 1 (represented by an "X") value and a logic 0 (represented by a blank, i.e., the absence of an "X") value, and the values of the bursts in sections 50A and 50C are opposite to the values of the adjacent bursts in sections 50B and 50D, respectively. For example, bursts $A_j$, $A_{j+1}$, and $A_{j+2}$ in section A have alternating values 0, 1, 0, respectively, and adjacent bursts $A_{j+1}$ and $B_{j+1}$ have opposite values logic 1 and logic 0, respectively. In one example, logic 1 represents a nonzero voltage level, and logic 0 represents a zero voltage level.

In operation, the head-position circuit (not shown in FIG. 4) uses the relative magnitudes of diagonally adjacent bursts in sections 50A and 50B or in sections 50C and 50D to center the head 14 (FIG. 1) over a desired track. For example, assume that the head-position circuit is to center the head 14 over the track $22_{n+2}$. First using a conventional technique omitted here for clarity, the head-position circuit coarsely positions the head 14 over or near the track $22_{n+2}$ and reads the track identifier 42 (FIG. 3) that the head 14 is over. If the read track identifer belongs to the track $22_{n+2}$, then the head-position circuit determines that the head 14 is close enough to the track $22_{n+2}$ to proceed with the fine positioning of the head. Because the boundary $52_{i+1}$ is aligned with the center of the track $22_{n+2}$, to center the head 14 the disk drive 10 (FIG. 1) reads and compares the magnitudes of the diagonally adjacent bursts $A_{j+1}$ and $B_j$ and calculates a position-error signal proportional to the difference between the magnitudes of $A_{j+1}$ and $B_j$. The head-position circuit uses this error signal to move the head 14 toward, and ideally over, the center of the track $22_{n+2}$.

More specifically, the disk drive 10 (FIG. 1) and the head-position circuit (not shown in FIG. 4) operate according to Table I to center the head 14 (FIG. 1) over the track $22_{n+2}$, where Mag A equals the read-voltage level, i.e., magnitude, of $A_{j+1}$, and Mag B equals the read-voltage level, i.e., magnitude, of $B_j$ ($A_j$ and $B_{j+1}$, which are logic 0, have zero voltage levels in this example):

TABLE I

| First Scenario | Mag A > Mag B | To center the head over track 22n + 2 if the head 14 is not centered over the track $22_{n+2}$ and is closer to the track $22_{n+3}$, the head-position circuit needs to moves the head 14 toward/to the center of the track $22_{n+2}$ in a direction toward the center (bottom of FIG. 4) of the disk 10. |
| --- | --- | --- |
| Second Scenario | Mag A = Mag B | The head 14 is centered over the track $22_{n+2}$. Therefore, the head-position circuit does not need to move the head 14 for track 22n + 2 centering . . . |

TABLE I-continued

| Third Scenario | Mag A < Mag B | The head 14 is not centered over the track $22_{n+2}$, and is closer to the track $22_{n+1}$. Therefore, the head-position circuit moves the head 14 toward/to the center of the track $22_{n+2}$ in a direction toward the center of the disk 10. |
| --- | --- | --- |

To illustrate the first scenario, assume that after coarse positioning, the head 14 is over the track $22_{n+3}$ at a position R, which is a radial distance +Dr from the center M of the track $22_{n+2}$—the center M is aligned with the boundary $52_{i+1}$. When the disk 10 (FIG. 1) rotates such that the head 14 is aligned with the burst section 50A, the burst $A_{j+1}$ is directly beneath the head such that the servo-signal voltage level, Mag A, has a maximum value. Conversely, when the disk 10 rotates such that the head 14 is aligned with the burst section 50B, the head is radially spaced +Dr from the boundary $52_{i+1}$, and thus from the burst $B_j$, such that the servo-signal voltage level, Mag B, has a nonmaximum value that is less than Mag A. Because Mag A>Mag B, the disk drive 10 "knows" the direction of the head-position error, i.e., that the head 14 is closer to the track $22_{n+3}$ than to the track $22_{n+1}$. Furthermore, |Mag A–Mag B| is proportional to the distance Dr between the head 14 and the center of the track $22_{n+2}$. Therefore, Mag A and Mag B together provide the disk drive 10 with the magnitude and direction of the head-position error, and the disk drive uses this vector to generate a position-error signal. In response to the position-error signal, the head-position circuit (not shown in FIG. 4) causes the motor 18 (FIG. 1) to reduce the head-position error by moving the head 14 from the position R toward/to the center M of the track $22_{n+2}$.

To illustrate the second scenario, assume that after coarse positioning, the head 14 is over the center M of the track $22_{n+2}$. When the head 14 is over the burst sections 50A and 50B, it is aligned with the boundary $52_{i+1}$. Because the boundary $52_{i+1}$ is equidistant from the bursts $A_{j+1}$ and $B_j$ in a radial direction, Mag A=Mag B. Because Mag A=Mag B, the disk drive 10 "knows" that the head 14 is centered over the track $22_{n+2}$, and thus "knows" that no position correction is necessary. This follows from |Mag A–Mag B|=0, which indicates that the error distance is zero.

To illustrate the third scenario, assume that after coarse positioning, the head 14 is over the track $22_{n+1}$ at a position Q, which is a radial distance –Dq from the center M of the track $22_{n+2}$—"–" indicates that Dq and Dr are in opposite directions from M. Therefore, because Mag B>Mag A, the disk drive 10 "knows" that the head 14 is closer to the track $22_{n+1}$ than to the track $22_{n+3}$, and thus generates a corresponding position-error signal. In response to this position-error signal, the head-position circuit causes the motor 18 to move the head 14 from Q toward/to the center M of the track $22_{n+2}$.

Although the servo-wedge portions (to the left of the bursts 50A–50D) of the tracks 22 are shown as having the same widths as the corresponding data-sector portions (to the right of the bursts 50A–50D) portions, these portions may have different widths. Where the widths are different, the boundaries 52 and 54 are aligned with the centers of the data-sector portions to accurately read the application data.

Figure 5:
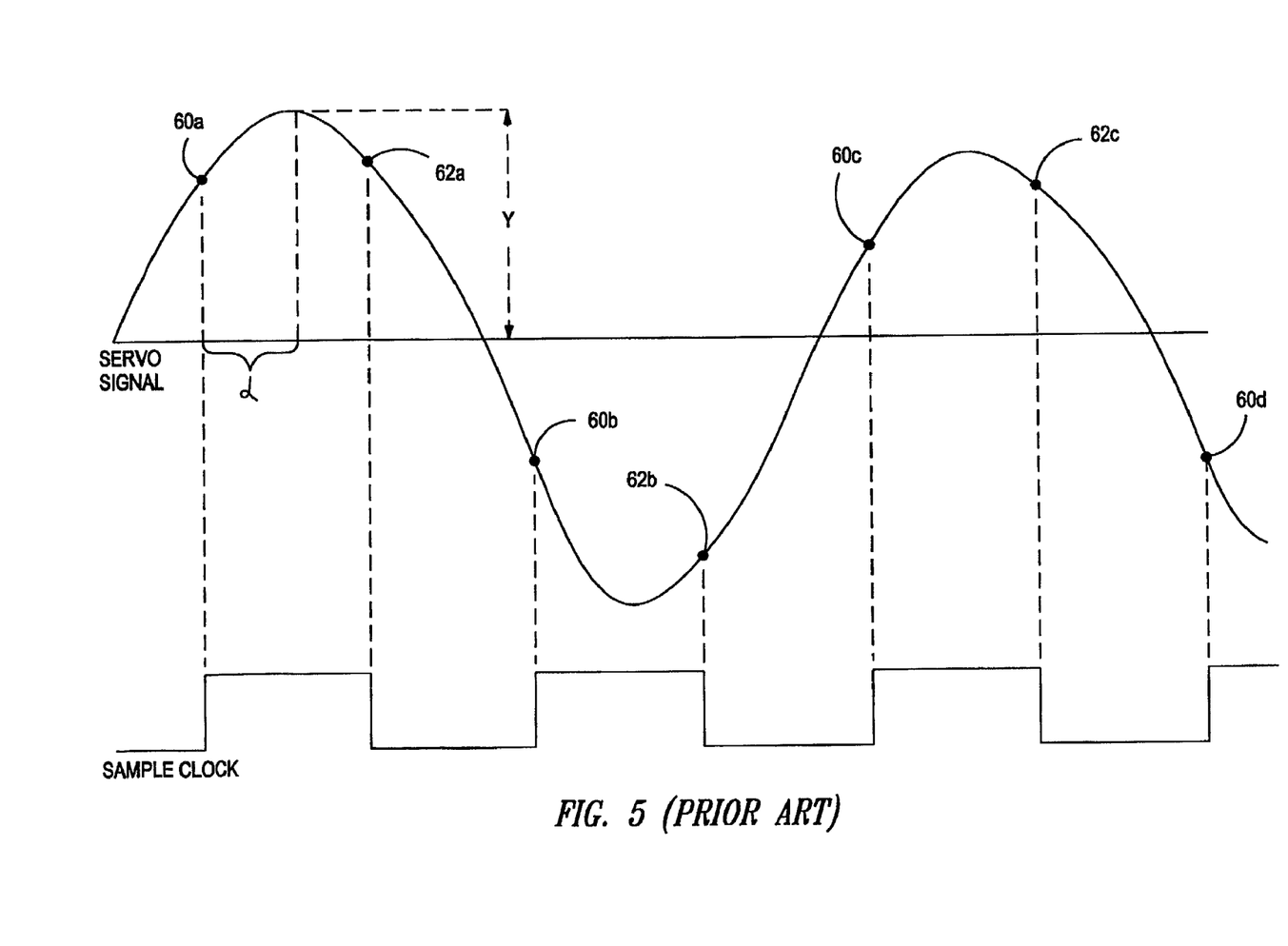
FIG. 5 is a plot of a conventional burst sinusoid and a conventional sample clock that is not synchronized to the burst sinusoid.

FIG. 5 is a plot of a sinusoidal servo signal that the head 14 (FIG. 1) generates while reading a head-position burst, and a sample clock that is not synchronized to the burst sinusoid.

According to one conventional technique, the servo circuit (not shown in FIG. 5) synchronizes the sample clock to the servo signal as the head 14 reads the preamble 34 (FIG. 3). Typically, this preamble servo signal (not shown) is a sinusoid similar or identical to the burst sinusoid, and the servo circuit aligns the edges of the sample clock to the peaks and zero crossings of the preamble sinusoid. For example, the servo circuit may align the rising edges of the servo clock with the peaks and the falling edges with the zero crossings. Unfortunately, by the time that the head 14 is over the position-burst sections 50A–50D (FIG. 4), phenomena such as noise and disk jitter may cause the edges of the sample clock to become offset from the peaks and zero crossings of the burst sinusoid. For example the rising and falling edges of the sample clock may respectively lead the peaks and zero crossings of the burst sinusoid by a nonzero angle $\alpha$, where it is desired that $\alpha$ equal zero.

Unfortunately, the lack of synchronization between the sample clock and the burst sinusoid may cause the head-position circuit (not shown in FIG. 5) to improperly position the head 14 over the selected track 22 (FIG. 4) during the fine positioning of the head. Typically, the peak voltage level Y of the burst sinusoid is the magnitude (e.g., Mag A or Mag B of FIG. 4) of the postion burst. In FIG. 4 for example, $|Y|>0$ represents a logic 1 (represented by an "X") and $Y=0$ (DC signal) represents a logic 0 (represented by the absence of "X"). Furthermore, the accuracy of the algorithm that the disk drive 10 (FIG. 1) uses to demodulate, ie., calculate the magnitudes of, the position bursts is often proportional to the level of synchronization between the sample clock and the burst sinusoid. For example, assuming perfect synchronization, the samples 60 taken at the rising edges of the sample clock are of the burst-sinusoid peaks, and thus equal Y. Therefore, a simple algorithm averages a number of the samples 60 to filter out noise and calculates the burst magnitude equal to this average. But if the clock and burst sinusoid are imperfectly aligned as shown, then, ignoring noise and jitter, this algorithm yields an incorrect burst magnitude $Y \cos \alpha$ instead of the correct burst magnitude Y. This incorrect burst magnitude may cause the disk drive 10 to calculate an inacccurate position-error signal, which may cause the motor 18 (FIG. 1) to move the head 14 to an undesired position.

Still referring to FIG. 5, according to another conventional technique, one can overcome the above-described lack of synchronization by heavily oversampling the burst sinusoid. To oversample, one increases the frequency of the sample clock with respect to the burst sinusoid. But because there are often contraints on the speed of the sample clock, one typically reduces the frequency of the burst sinusoid by lengthening the bursts 50A–50D (FIG. 4). To obtain accurate estimation of the burst amplitude Y, it is generally accepted that the sample clock must generate at least ten samples per cycle of the burst sinusoid, and thus must have a frequency at least five times that of the burst sinusoid. Comparitively, for the above-described synchronous technique, the sample clock generates four samples 60 and 62 per cycle and has a frequency that is twice that of the burst sinusoid as shown in FIG. 5.

Unfortunately, although heavily oversampling allows one to calculate the burst amplitude Y with an unsynchronized sampling clock, it typically requires more disk space due to the above-described lengthening of the position bursts 50A–50D (FIG. 4).

SUMMARY OF THE INVENTION

In accordance with an embodiment of the invention, a circuit receives fewer than ten samples per cycle of a position burst and calculates the burst magnitude from the samples such that the accuracy of the burst magnitude is independent of the timing of the samples with respect to the burst.

By using an algorithm that does not require heavy over sampling—for purposes of this application, heavy over sampling is a sampling rate more than four samples per cycle—and that is independent of the level of synchronization between the sample clock and the position bursts, such a circuit often allows shorter position bursts than a heavy-oversampling circuit allows and calculates the burst magnitudes and the head-position-error signal more accurately than a circuit that uses a timing-dependent algorithm.

DESCRIPTION OF THE PREFERRED EMBODIMENTS

Figure 6:
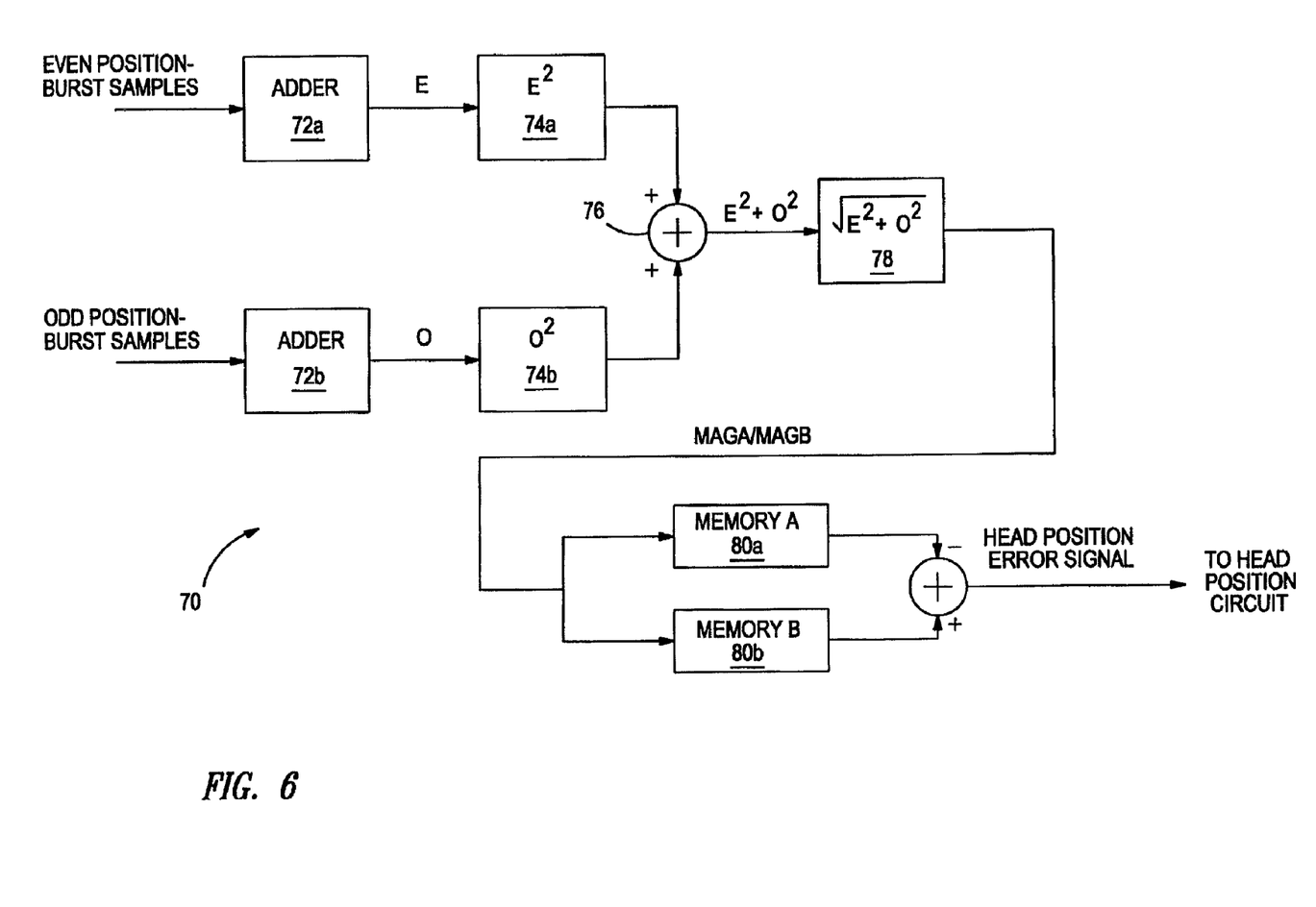
FIG. 6 is a block diagram of a position-burst demodulator according to an embodiment of the invention.

FIG. 6 is a block diagram of a position-burst demodulator 70 according to an embodiment of the invention. As discussed below in conjunction with FIG. 7, the circuit uses a variation of a known trigonometric identity to calculate the magnitude of a position burst (FIGS. 4 and 5) independently of the synchronization, or lack thereof, between the sample clock (FIG. 5) and the postion burst. In the embodiment discussed in conjunction with FIG. 6, the demodulator 70 is part of a servo circuit (FIG. 8) and provides a head-position-error signal to a head-position circuit (FIG. 9). Alternatively, the demodulator 70 may be part of the head-position circuit.

Figure 7:
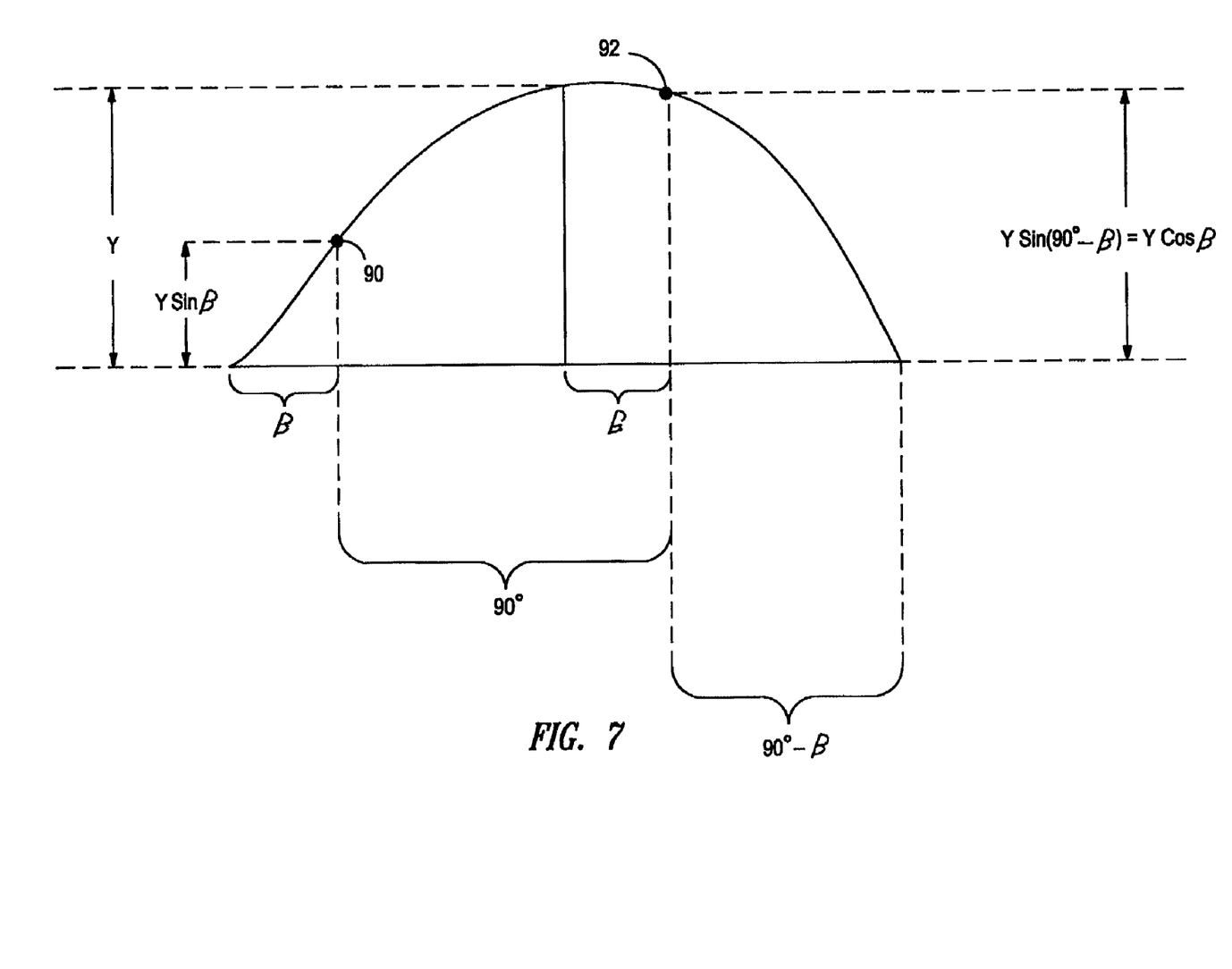
FIG. 7 is a phase diagram used to explain how the demodulator of FIG. 6 calculates the magnitude of a position burst according to an embodiment of the invention.

FIG. 7 is a phase diagram of a positive half period of the burst sinusoid of FIG. 5, and illustrates how the position-burst demodulator 70 of FIG. 6 calculates a synchronization-independent value for the magnitude Y of the burst sinusoid. Specifically, samples 90 and 92 are 90° apart. Therefore, one can calculate the amplitude Y according to the following equations, which follow from the well-known trigonometric identity $\sin^2\beta + \cos^2\beta = 1$:

$$(Y \sin \beta)^2 + (Y \cos \beta)^2 = Y^2 \sin^2\beta + Y^2 \cos^2\beta = Y^2(\sin^2\beta + \cos^2\beta) = Y^2 \quad (1)$$

$$\text{Sample } 90 = Y \sin \beta_2 \quad (2)$$

$$\text{Sample } 92 = Y \cos \beta_2 \quad (3)$$

$$Y^2 = (\text{sample } 90)^2 + (\text{sample } 92)^2 \quad (4)$$

$$Y = \sqrt{(\text{sample } 90)^2 + (\text{sample } 92)^2} \quad (5)$$

Further details of this identity are discussed in commonly owned U.S. patent application Ser. No. 09/503,949, filed Feb. 14, 2000, entitled "A CIRCUIT AND METHOD FOR CONTROLLING THE GAIN OF AN AMPLIFIER BASED ON THE SUM OF SAMPLES OF THE AMPLIFIED SIGNAL", and U.S. patent application Ser. No. 09/503,399, filed Feb. 14, 2000, entitled "A CIRCUIT AND METHOD FOR CONTROLLING THE GAIN OF AN AMPLIFIER", which are incorporated by reference.

Referring again to FIG. 6, in one embodiment the demodulator 70 improves upon the above-described trigonometric identity by effectively averaging the samples of the burst sinusoid of FIGS. 5 and 7 to filter out noise. For example purposes, the operation of the demodulator 70 is described where the head-position circuit (FIG. 9) is attempting to center the head 14 (FIGS. 1 and 9 ) over the track $22_{n+2}$ (FIG. 4), it being understood that the operation of the demodulator 70 is similar when the head-position circuit attempts to center the head over another track.

More specifically, referring to FIGS. 4–6, an adder 72a sums the magnitudes of a number—for example eight—of even samples 60 of the position burst $A_{j+1}$ to generate a sum E, and an adder 72b sums the magnitudes of the same number of odd samples 62 of the same postion burst to generate a sum O. In one embodiment, the adders 72a and 72b respectively generate the sums E and O by summing the negative of every other sample. For example, the even sample 60a is positive, but the next even sample 60b is negative. Therefore, the adder 72a sums the samples 60a and 60c, which are positive values, with the negatives of the samples 60b and 60d, these negatives also being positive values (the negative of a negative is a positive). Likewise, the adder 72b sums the samples 62a and 62c with the negatives of the samples 62b and 62d. Although one could generate E equal to a single sample 60 and O equal to a single sample 62, summing multiple samples 60 and 62 to respectively generate E and O averages out noise that may contaminate the burst sinusoid.

The functions of the adders 72a and 72b is represented by the following equations:

$$E=(\text{sample } 60a - \text{sample } 60b) + (\text{sample } 60c - \text{sample } 60d) \quad (6)$$

$$O=(\text{sample } 62a - \text{sample } 62b) + (\text{sample } 62c - \text{sample } 62d) \quad (7)$$

Next, multipliers 74a and 74b respectively square E and O and a summer 76 sums $E^2$ and $O^2$ according to equation (4), where E effectively corresponds to "sample 90" and O effectively corresponds to "sample 92".

Then, a root circuit 78 takes the square root of $E^2+O^2$ to generate the magnitude Mag A of the burst $A_{j+1}$, and stores Mag A in a first memory 80a.

Next, the demodulator 70 calculates the magnitude Mag B of the burst Bj in a similar manner and stores Mag B in a second memory 80b.

Then, a subtractor 82 calculates the head-position-error signal equal to Mag B–Mag A. The polarity (+ or −) of the signal indicates the direction of the error, and the value |Mag B–Mag A| indicates the magnitude of the error. Using the error signal, the head-position circuit (FIG. 9) finely postions the head 14 as discussed above in conjunction with FIG. 4. In other embodiments, however, the subtractor 82 may calculate the error signal equal to Mag A–Mag B, or the demodulator 70 or head-position circuit may further process the error signal before using it to finely position the head 14.

Although the demodulator 70 is described as including respective circuit blocks 72a–80b, in other embodiments the demodulator may include a processor or logic circuit programmed to implement the above-described algorithm. Furthermore, the demodulator 70 may use other algorithms to calculate $E^2$, $O^2$, and MAG A and MAG B. For example, the circuit 70 can square an even sample 60 to generate $E^2$, square the next odd sample 62 to generate $O^2$, take the square root of $E^2+O^2$, and sum the resulting square roots of $E^2+O^2$ over a number of samples 60 and 62 to obtain MAG A or MAG B. Other algorithms are contemplated but are omitted for brevity.

Figure 8:
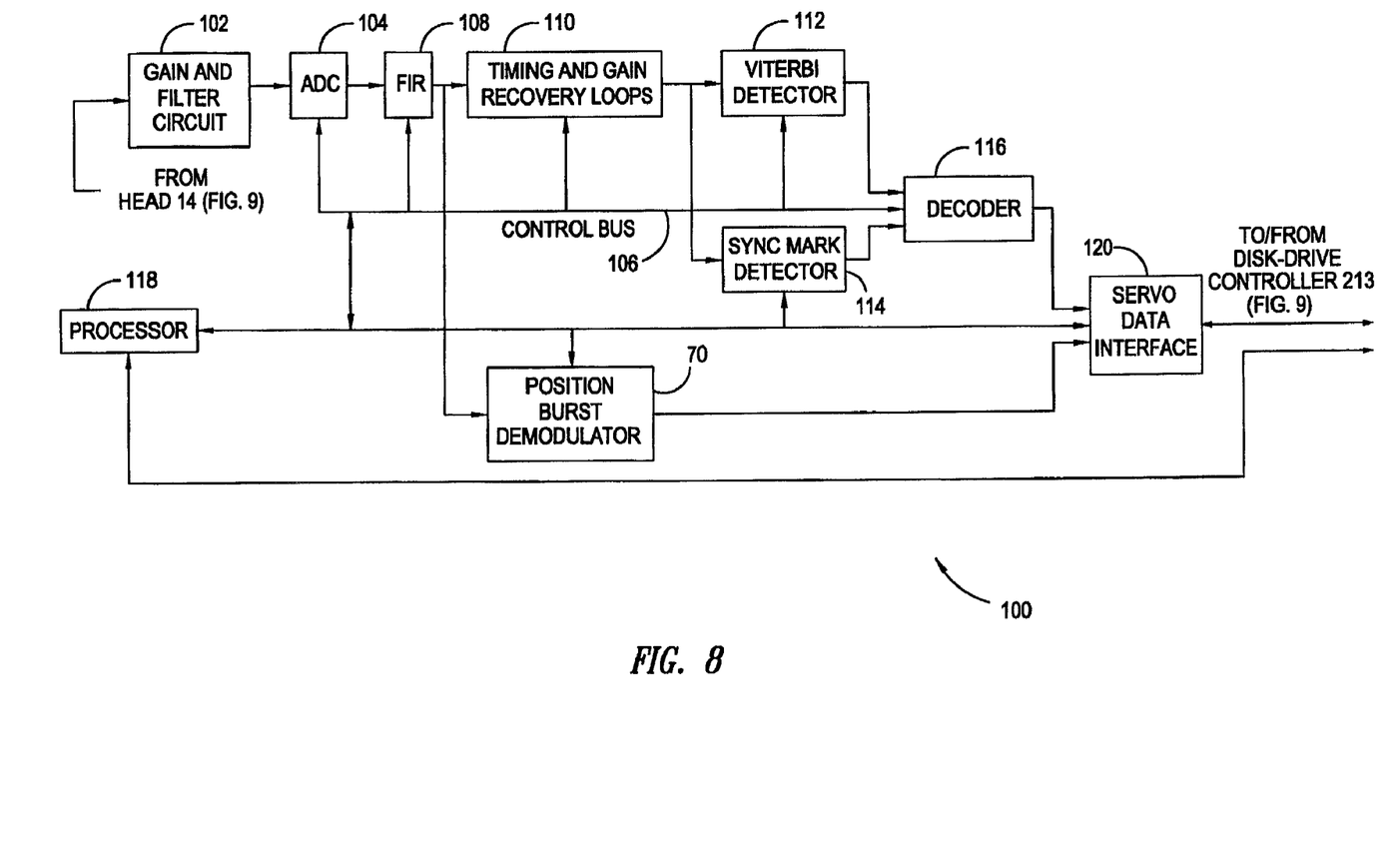
FIG. 8 is a block diagram of a servo circuit that incorporates the position-burst demodulator of FIG. 6 according to an embodiment of the invention.
Figure 9:
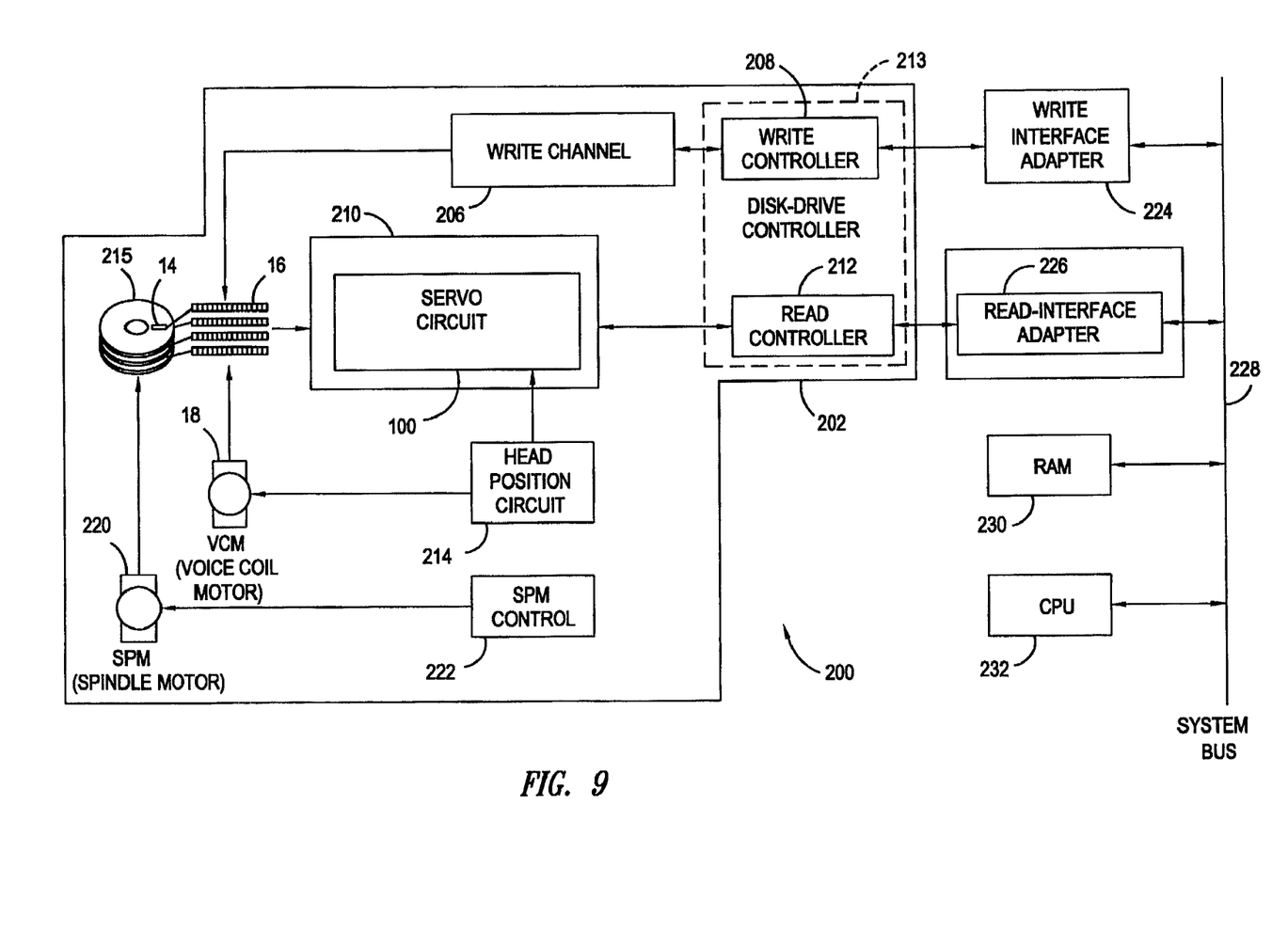
FIG. 9 is a block diagram of a disk-drive system that incorporates the servo circuit of FIG. 8 according to an embodiment of the invention.

FIG. 8 is block diagram of a synchronous servo circuit 100, which includes the position-burst demodulator 70 of FIG. 6 according to an embodiment of the invention. The circuit 100 includes a gain and filter circuit 102, which adjusts the gain and filters the servo signal from the read head 14. An analog-to-digital converter (ADC) 104 receives the sample clock (FIG. 5) on a control bus 106 and generates digital samples, such as the samples 60 and 62 (FIG. 5), of the analog servo signal from the circuit 102. A finite-impulse-response (FIR) filter 108 equalizes the samples from the ADC 104, and timing and gain recovery loops 110 effectively synchronize the sample clock to the servo signal and maintain the gain of the circuit 100 at a desired level. In one embodiment, the circuit 102 and FIR filter 108 equalize the servo signal to a PR4 target, although they may equalize the servo signal to another target such as EPR4. A Viterbi detector 112 recovers servo data such as the location identifier 38 (FIG. 3) from the servo-signal samples, and a sync-mark detector 114 recovers the servo sync mark 36 (FIG. 5) from the servo signal. If the servo data is encoded, a decoder 116 decodes the recovered servo data and sync mark from the Viterbi and sync mark detectors 112 and 114, respectively. The position-burst demodulator 70 receives the even and odd samples 60 and 62 (FIG. 5) from the FIR 108 and generates the head-position-error signal, and a processor 118 controls the components of the servo circuit 100 via the control bus 106. A servo-data interface 120 interfaces the decoder 116, processor 118, and demodulator 70 to a disk-drive controller (FIG. 9).

Because the demodulator 70 implements a timing-independent algorithm as discussed above, it can calculate the position-error signal without introducing additional latency into the algorithm. Specifically, the timing-recovery portion of the loops 110 synchronizes the sample clock to the servo signal by shifting the values of the samples, not by shifting the phase of the sample clock. Therefore, if the demodulator 70 required synchronized samples, it would need to receive them from a point after the timing-loop portion of the loops 110, which would introduce significant latency into the burst-demodulation calculation. But because the burst-demodulation algorithm is timing independent, the demodulator 70 can receive the potentially unsynchronized burst samples from the FIR 108, and thus calculate the position-error signal without the latency of the loops 110.

Still referring to FIG. 8, the circuit 102, ADC 104, FIR 108, loops 110, Viterbi detector 112, decoder 116, processor 118 and operation of the servo circuit 100 are further discussed in commonly owned patent applications 60/301,505 entitled "DATA-STORAGE DISK HAVING FEW OR NO SPIN-UP WEDGES AND METHOD FOR WRITING SERVO WEDGES ONTO THE DISK," 60/301,504 entitled "CIRCUIT AND METHOD FOR DETECTING A SERVO WEDGE ON SPIN UP OF A DATA-STORAGE DISK", 60/301,469 entitled "CIRCUIT AND METHOD FOR DETECTING A SPIN-UP WEDGE AND A CORRESPONDING SERVO WEDGE ON SPIN UP OF A DATA-STORAGE DISK", 60/301,503 entitled "SERVO CIRCUIT HAVING A SYNCHRONOUS SERVO CHANNEL AND METHOD FOR SYNCHRONOUSLY RECOVERING SERVO DATA". The timing-recovery loop of the loops 110 is further discussed in commonly owned U.S. patent application Ser. No. 09/387,146, filed Aug. 31, 1999, entitled "DIGITAL TIMING RECOVERY USING BAUD RATE SAMPLING", and the gain-recovery loop of the loops 110 and the Viterbi detector 112 are also discussed in commonly owned patent application Ser. No. 09/783,801, filed Feb. 14, 2001, entitled "VITERBI DETECTOR AND METHOD FOR RECOVERING A BINARY SEQUENCE FROM A READ SIGNAL," all of which are incorporated by reference. The sync mark detecor 114 is further discussed in commonly owned patent application Ser. No. 09/993,779 entitled "CIRCUIT AND METHOD FOR DETECTING THE PHASE OF A SERVO SIGNAL", and the decoder 116 may be constructed to decode servo data that is encoded according to the scheme discussed in commonly owned U.S. patent application Ser. No. 09/783,801, filed Feb. 14, 2001, entitled "VITERBI DETECTOR AND METHOD FOR RECOVERING A BINARY SEQUENCE FROM A READ SIGNAL", or the scheme discussed in 60/301,506 entitled "A DATA CODE AND METHOD FOR CODING DATA", which are incorporated by reference.

FIG. 9 is a block diagram of a disk-drive system 200 that incorporates the servo circuit 100 of FIG. 8 according to an embodiment of the invention, where like numbers reference components common to FIGS. 1 and 9. The disk-drive system 200 includes a disk drive 202, which incorporates the servo circuit 30 of FIG. 8. The disk drive 202 includes the read-write head 14, a write channel 206 for generating and driving the head 14 with a write signal, and a write controller 208 for interfacing the write data to the write channel 206. The disk drive 202 also includes a read channel 210 for receiving servo and application-data read signals from the head 32 and for recovering data from these read signals, and includes a read controller 212 for organizing the read data. Together, the write and read controllers 208 and 212 compose a disk-drive controller 213. The read channel 210 includes the servo circuit 30, which receives the servo signal from the head 14, recovers the servo data from the servo signal, and provides the recovered servo data to a head-position circuit 214. The disk drive 202 further includes a storage medium such as one or more disks 215, each of which may contain data on one or both sides and which may be magnetic, optical, or another type of storage disk. For example, the disks 215 may be similar to the disk 12 of FIG. 1. The head 14 writes/reads the data stored on the disk 12, and is connected to the movable support arm 16. As discussed above in conjunction with FIGS. 6–7, the servo circuit 100 calculates the position-error signal, and, in response to the error signal, the head-position circuit 214 provides a control signal to the voice-coil motor (VCM) 18, which positionally maintains/radially moves the arm 16 so as to positionally maintain/radially move the head 14 over the desired data tracks on the disks 215. A spindle motor (SPM) 220 and a SPM control circuit 222 respectively rotates the disks 215 and maintains them at the proper rotational speed.

The disk-drive system 200 also includes write and read interface adapters 224 and 226 for respectively interfacing the disk-drive controller 213 to a system bus 228, which is specific to the system used. Typical system busses include ISA, PCI, S-Bus, Nu-Bus, etc. The system 200 typically has other devices, such as a random access memory (RAM) 230 and a central processing unit (CPU) 232 coupled to the bus 228.

As discussed above, although the burst demodulator 70 (FIG. 6) is described as being part of the servo circuit 100, it may be part of the head-position circuit 214 instead.

From the foregoing it will be appreciated that, although specific embodiments of the invention have been described herein for purposes of illustration, various modifications may be made without deviating from the spirit and scope of the invention.

What is claimed is:

1. A position-burst demodulator, comprising:
an input circuit operable to receive even and odd samples of a first servo position burst, to add the even samples to generate a first sum and to add the odd samples to generate a second sum;
an intermediate circuit coupled to the input circuit and operable to square the first and second sums, and to add the squared first and second sums to generate a third sum;
an output circuit coupled to the intermediate circuit and operable to calculate the square root of the third sum to generate an output signal representing a magnitude of the first servo position burst.

2. The demodulator of claim 1 wherein the even and odd samples comprise consecutive samples.

3. The demodulator of claim 1 wherein the even and odd samples comprise average samples.

4. A position-burst demodulator, comprising:
an input circuit operable to receive and square first and second samples of a first servo position burst;
an intermediate circuit coupled to the input circuit and operable to add the squared first and second samples to generate a first sum;
an output circuit coupled to the intermediate circuit and operable to calculate the square root of the first sum;
wherein the input circuit is operable to receive and square first and second samples of a second servo position burst;
wherein the intermediate circuit is operable to add the squared first and second samples of the second servo position burst to generate a second sum;
wherein the output circuit is operable to calculate the square root of the second sum; and
a difference circuit operable to calculate a difference between the square roots of the first and second sums to generate an output signal representing an error between the first and second servo position bursts.

5. A position-burst demodulator, comprising:
a first adder operable to receive even and odd samples of a first servo position burst, to add the even samples together to generate a first sum, and to add the odd samples together to generate a second sum;
a power circuit coupled to the first adder and operable to square the first sum and the second sum to respectively generate first and second squared sums;
a second adder coupled to the power circuit and operable to add the first and second squared sums to generate a first sum of squares; and
a root circuit coupled to the second adder and operable to calculate the square root of the first sum of squares to generate an output signal representing a magnitude of the first servo position burst.

6. The demodulator of claim 5 wherein the first adder is operable to add the magnitudes of the even samples together to generate the first sum and to add the magnitudes of the odd samples together to generate the second sum.

7. The position-burst demodulator of claim 5 wherein the first adder is operable to invert every other even sample and add the inverted and noninverted even samples to generate the first sum, and is operable to invert every other odd sample and add the inverted and noninverted odd samples to generate the second sum.

8. A position-burst demodulator, comprising:
a first adder operable to receive first and second sets of samples of a first servo position burst, to add the samples in the first set together to generate a first sum, and to add the samples in the second set together to generate a second sum;
a power circuit coupled to the first adder and operable to square the first sum and the second sum to respectively generate first and second squared sums;
a second adder coupled to the squarer and operable to add the first and second squared sums to generate a first sum of squares;
a root circuit coupled to the second adder and operable to calculate the square root of the first sum of squares;
wherein the first adder is operable to receive first and second sets of samples of a second servo position burst, to add the samples in the first set together to generate a third sum, and to add the samples in the second set together to generate a fourth sum;

wherein the power circuit is operable to square the third sum and the fourth sum to respectively generate third and fourth squared sums;

wherein the second adder is operable to add the third and fourth squared sums to generate a second sum of squares;

wherein the root circuit is operable to calculate the square root of the second sum of squares; and a difference circuit coupled to the root circuit and operable to calculate a difference between the square roots of the first and second sums of squares to generate an output signal representing an error between the first and second servo position bursts.

9. The position-burst demodulator of claim 8, wherein the first adder is operable to add the magnitudes of the samples of the first servo position burst in the first set together to generate the first sum, add the magnitudes of the samples of the first servo position burst in the second set together to generate the second sum, to add the samples of the second servo position burst in the first set together to generate the third sum, and add the samples of the second servo position burst in the second set together to generate the fourth sum.

10. The position-burst demodulator of claim 8, wherein the first adder is operable to invert every of sample of the first servo position burst in the first set and add the inverted and noninverted siamples together to generate the first sum, invert every other sample of the first servo position burst in the second set and add the inverted and noninverted samples together to generate the second sum, invert every other sample of the second servo position burst in the first set and add the inverted and noninverted samples together to generate the third sum, and invert every other sample of the second servo position burst in the second set and add the inverted and noninverted samples together to generate the fourth sum.

11. A position-burst demodulator, comprising:
a first adder operable to receive first and second sets of samples of a first servo position burst, to add the samples in the first set together to generate a first sum, and to add the samples in the second set together to generate a second sum;
a power circuit coupled to the first adder and operable to square the first sum and the second sum to respectively generate first and second squared sums;
a second adder coupled to the squarer and operable to add the first and second squared sums to generate a first sum of squares;
a root circuit coupled to the second adder and operable to calculate the square root of the first sum of squares;
wherein the first adder is operable to receive first and second sets of samples of a second servo position burst, to add the samples in the first set together to generate a third sum, and to add the samples in the second set together to generate a fourth sum;
wherein the power circuit is operable to square the third sum and the fourth sum to respectively generate third and fourth squared sums;
wherein the second adder is operable to add the third and fourth squared sums to generate a second sum of squares;
wherein the root circuit is operable to calculate the square root of the second sum of squares;
a memory operable to store the square roots of the first and second sums of squares; and
a difference circuit coupled to the memory and operable to calculate a difference between the stored square roots of the first and second sums of squares to generate an output signal representing an error between the first and second servo position bursts.

12. The position-burst demodulator of claim 11, wherein the first adder is operable to add the magnitudes of the samples of the first servo position burst in the first set together to generate the first sum, add the magnitudes of the samples of the first servo position burst in the second set together to generate the second sum, to add the samples of the second servo position burst in the first set together to generate the third sum, and add the samples of the second servo position burst in the second set together to generate the fourth sum.

13. The position-burst demodulator of claim 11, wherein the first adder is operable to invert every of sample of the first servo position burst in the first set and add the inverted and noninverted siamples together to generate the first sum, invert every other sample of the first servo position burst in the second set and add the inverted and noninverted samples together to generate the second sum, invert every other sample of the second servo position burst in the first set and add the inverted and noninverted samples together to generate the third sum, and invert every other sample of the second servo position burst in the second set and add the inverted and noninverted samples together to generate the fourth sum.

14. A circuit operable to:
add even samples of a first servo position burst to generate a first sum;
add odd samples of the first servo position burst to generate a second sum;
square the first and second sums;
add the squared first and second sums to generate a third sum; and
calculate the square root of the third sum to generate an output signal representing a magnitude of the first servo position burst.

15. The circuit of claim 14, further operable to add the magnitudes of the even samples to generate the first sum and to add the magnitudes of the odd samples to generate the second sum.

16. The circuit of claim 14, further operable to invert negative ones of the even samples and to add the inverted and noninverted even samples to generate the first sum, and further operable to invert negative ones of the odd samples and to add the inverted and noninverted odd samples to generate the second sum.

17. A circuit operable to:
square first and second samples of a first servo position burst;
add the squared first and second samples to generate a first sum;
calculate the square root of the first sum;
square first and second samples of a second servo position burst;
add the squared first and second samples of the second servo position burst to generate a second sum;
calculate the square root of the second sum; and
calculate a difference between the square roots of the first and second sums to generate an output signal representing an error between the first and second servo position bursts.

18. A circuit operable to:
receive fewer than ten total samples per cycle of a first servo position burst, the total samples including even and odd samples;

receive fewer than ten total samples per cycle of a second servo position burst, the total samples including even and odd samples;
sum the even samples for the first servo position burst;
sum the odd samples for the first servo position burst;
square the summed even samples for the first servo position burst;
square the summed odd samples for the first servo position burst;
sum the squared sums of the even and odd samples for the first servo position burst;
obtain the square root value of the summed squared sums of the even and odd samples for the first servo position burst;
perform the same operations on the even and odd samples for the second servo position burst; and
calculate from the square root values a head-position error signal from the samples of the first and second bursts only such that the accuracy of the error signal is independent of the timing of the samples with respect to the bursts.

19. The circuit of claim 18, further operable to generate the samples of the first and second servo position bursts.

20. The circuit of 18 wherein:
summing the even samples for the first servo position burst comprises summing the magnitudes of the even samples; and
summing the odd samples for the first servo position burst comprises summing the magnitudes of the odd samples for the first servo position burst.

21. The circuit of 18 wherein:
summing the even samples for the first servo position burst comprises inverting every other even sample summing the inverted and noninverted even samples; and
summing the odd samples for the first servo position burst comprises inverting every other odd sample and summing the inverted and noninverted odd samples.

22. A disk-drive system, comprising:
a data-storage disk having a surface, data tracks defined on the surface, the data tracks having respective centers, the data-storage disk also having servo wedges located in the tracks, each servo wedge including position bursts;
a motor coupled to and operable to rotate the disk;
a read head operable to generate a read signal that represents the position bursts;
a read-head positioning circuit operable to move the read head toward the center of a data track in response to a position-error signal; and
a servo circuit coupled to the read head and to the read-head positioning system, the servo circuit operable to
sample the read signal,
square first and second samples of both a first position burst and a second position burst in a servo wedge located in the data track,
add the squared first and second samples of the first position burst to generate a first sum and add the squared first and second samples of the second position burst to generate a second sum,
calculate a first square root of the first sum and a second square root of the second sum,
calculate a difference between the first and second square roots, and
generate the position-error signal equal to the difference.

23. A disk-drive system, comprising:
a data-storage disk having a surface, data tracks defined on the surface, the data tracks having respective centers, the data-storage disk also having servo wedges located in the tracks, each servo wedge including position bursts;
a motor coupled to and operable to rotate the disk;
a read head operable to generate a read signal that represents the position bursts;
a read-head positioning circuit operable to move the read head toward the center of a data track in response to a position-error signal; and
a servo circuit coupled to the read head and to the read-head positioning system, the servo circuit operable to
sample the read signal fewer than ten times per cycle of the position bursts, and
calculate the position-error signal from the samples of no more than two of the position bursts by, for each positon burst, summing the even samples, summing the odd samples, squaring the sum of even samples, squaring the sum of odd samples, taking the square root of the squared sums, and taking the difference between the square root of the squared sums, such that the accuracy of the position-error signal is independent of the timing of the samples with respect to the read signal.

24. The disk-drive system of claim 23 wherein the servo circuit is operable to sum the even samples by summing the magnitudes of the even samples and is operable to sum the odd samples by summing the magnitudes of the odd samples.

25. The disk-drive system of claim 23 wherein the servo circuit is operable to sum the even samples by inverting every other even sample and summing the inverted and noninverted even samples, and is operable to sum the odd samples by inverting every other odd sample and summing the inverted and noninverted odd samples.

26. A method, comprising:
generating a first sum by adding even samples of a first servo position burst;
generating a second sum by adding odd samples of the first servo position burst;
squaring the first and second sums;
generating a third sum by adding the squared first and second sums together; and
generating an output signal representing a magnitude of the first servo position burst by calculating the square root of the third sum.

27. The method of claim 23, wherein:
generating the first sum comprises generating the first sum by adding the magnitudes of the even samples; and
generating the second sum comprises generating the second sum by adding the magnitudes of the odd samples.

28. The method of claim 26, wherein:
generating the first sum comprises generating the first sum by inverting every other even sample and adding the inverted and noninverted even samples; and
generating the second sum comprises generating the second sum by inverting every other odd sample and adding the inverted and noninverted odd samples.

29. A method, comprising:
squaring first and second samples of a first servo position burst;
generating a first sum by adding the squared first and second samples together;
calculating the square root of the first sum;
squaring first and second samples of a second servo position burst;
generating a second sum by adding the squared first and second samples of the second servo position burst together;
calculating the square root of the second sum; and generating an output signal representing an error between the first and second servo position bursts by calculating a difference between the square roots of the first and second sums.

30. A method, comprising:
receiving even and odd samples of a first servo position burst;
adding the even samples together to generate a first sum;
adding the odd samples together to generate a second sum;
squaring the first and second sums to respectively generate first and second squared sums;
adding the first and second squared sums together to generate a first sum of squares; and
calculating the square root of the first sum of squares to generate an output signal representing a magnitude of the first servo position burst.

31. The method of claim 30 wherein:
adding the even samples comprises adding the magnitudes of the even samples together to generate the first sum; and
adding the odd samples comprises adding the magnitudes of the odd samples together to generate the second sum.

32. The method of claim 30 wherein:
adding the even samples together comprises adding the absolute values of the even samples together to generate the first sum; and
adding the odd samples together comprises adding the absolute values of the odd samples together to generate the second sum.

33. The method of claim 30 wherein:
adding the even samples together comprises inverting every other even sample and adding the inverted and noninverted even samples together to generate the first sum; and
adding the odd samples together comprises inverting every other odd sample and adding the inverted and noninverted odd samples together to generate the second sum.

34. A method, comprising:
receiving first and second sets of samples of a first servo position burst;
adding the samples in the first set together to generate a first sum;
adding the samples in the second set together to generate a second sum;
squaring the first and second sums to respectively generate first and second squared sums;
adding the first and second squared sums together to generate a first sum of squares;
calculating the square root of the first sum of squares;
receiving first and second sets of samples of a second servo position burst;
adding the samples in the first set together to generate a third sum;
adding the samples in the second set together to generate a fourth sum;
squaring the third sum and the fourth sum to respectively generate third and fourth squared sums;
adding the third and fourth squared sums to generate a second sum of squares;
calculating the square root of the second sum of squares; and
calculating a difference between the square roots of the first and second sums of squares to generate an output signal representing an error between the first and second servo position bursts.

35. The method of claim 34 wherein:
adding the samples of the first position burst in the first set together comprises adding the magnitudes of the samples in the first set together to generate the first sum;
adding the samples of the first position burst in the second set together comprises adding the magnitudes of the samples in the second set together to generate the second sum;
adding the samples of the second position burst in the first set together comprises adding the magnitudes of the samples in the first set together to generate the third sum; and
adding the samples of the second position burst in the second set together comprises adding the magnitudes of the samples in the second set together to generate the fourth sum.

36. The method of claim 34 wherein:
adding the samples of the first position burst in the first set together comprises inverting every other sample in the first set and adding the inverted and noninverted samples in the first set together to generate the first sum;
adding the samples of the first position burst in the second set together comprises inverting every other sample in the second set and adding the inverted and noninverted samples in the second set together to generate the second sum;
adding the samples of the second position burst in the first set together comprises inverting every other sample in the first set and adding the inverted and noninverted samples in the first set together to generate the third sum; and
adding the samples of the second position burst in the second set together comprises inverting every othe sample in the second set and adding the inverted and noninverted smaples in the second set together to generate the fourth sum.

37. A method, comprising:
receiving fewer than ten total samples per cycle of a first servo position burst, the total samples including even and odd samples;
receiving fewer than ten total samples per cycle of a second servo position burst, the total samples including even and odd samples;
summing the even samples for the first servo position burst;
summing the odd samples for the first servo position burst;
squaring the summed even samples for the first servo position burst;
squaring the summed odd samples for the first servo position burst;
summing the squared sums of the even and odd samples for the first servo position burst;
obtaining the square root value of the summed squared sums of the even and odd samples for the first servo position burst;
repeating the operations of summing through obtaining on the even and odd samples for the second servo position burst; and
calculating from the square root values a head-position error signal from the samples of the first and second bursts only such that the accuracy of the error signal is independent of the location of the samples with respect to the bursts.

38. The method of claim 37, further comprising generating the samples of the first and second servo position bursts.

39. The method of claim 37 wherein:
  summing the even samples for the first servo position burst comprises summing the magnitudes of the even samples; and
  summing the odd samples for the first servo position burst comprises summing the magnitudes of the odd samples.

40. The method of claim 37 wherein:
  summing the even samples for the first servo position burst comprises inverting every other even sample and summing the inverted and noninverted even samples; and
  summing the odd samples for the first servo position burst comprises inverting every other odd sample and summing the inverted and noninverted odd samples.

41. A method, comprising:
  generating a read signal with a read head, the read signal representing position bursts on a data-storage disk;
  sampling the read signal;
  squaring first and second samples of both a first position burst and a second position burst located in a data track of the disk;
  adding the squared first and second samples of the first position burst to generate a first sum;
  adding the squared first and second samples of the second position burst to generate a second sum;
  calculating a first square root of the first sum;
  calculating a second square root of the second sum;
  calculating a difference between the first and second square roots;
  generating a position-error signal equal to the difference; and
  moving the read head toward the center of the data track in response to the position-error signal.

42. A method, comprising:
  generating a read signal with a read head, the read signal representing position bursts on a data-storage disk;
  sampling the read signal fewer than ten times per position-burst cycle;
  calculating a position-error signal from the samples of no more than two of the position bursts by, for each positon burst, summing the even samples, summing the odd samples, squaring the sum of even samples, squaring the sum of odd samples, taking the square root of the squared sums, and taking the difference between the square root of the squared sums, such that the accuracy of the position-error signal is independent of the timing of the samples with respect to the read signal; and
  moving the read head toward the center of a data track on the disk in response to the position-error signal.

43. The method of claim 42 wherein:
  summing the even samples comprises summing the magnitudes of the even samples; and
  summing the odd samples comprises summing the magnitudes of the odd samples for the first servo position burst.

44. The method of claim 42 wherein:
  summing the even samples comprises inverting every other even sample and summing the inverted and noninverted even samples; and
  summing the odd samples comprises inverting every other odd sample and summing the inverted and noninverted odd samples.

45. A circuit operable to:
  receive even and odd samples of first and second servo position bursts;
  sum the even samples for each of the first and second servo position bursts;
  sum the odd samples for each of the first and second servo position bursts; and
  calculate a head-position error signal from the sums of the even and odd samples of the first and second bursts only such that the accuracy of the error signal is independent of the timing of the samples with respect to the bursts.

46. The circuit of claim 45 wherein:
  summing the even samples comprises summing the magnitudes of the even samples; and
  summing the odd samples comprises summing the magnitudes of the odd samples for the first servo position burst.

47. The circuit of claim 45 wherein:
  summing the even samples comprises inverting every other even sample and summing the inverted and noninverted even samples; and
  summing the odd samples comprises inverting every other odd sample and summing the inverted and noninverted odd samples.

48. A method, comprising:
  receiving even and odd samples of first and second servo position bursts;
  summing the even samples for each of the first and second servo position bursts;
  summing the odd samples for each of the first and second servo position bursts; and
  calculating a head-position error signal from the samples of the first and second bursts only such that the accuracy of the error signal is independent of the timing of the samples with respect to the bursts.

49. The position-burst demodulator of claim 1 wherein the input circuit is operable to add the magnitudes of the even samples to generate the first sum and to add the magnitudes of the odd samples to generate the second sum.

50. The position-burst demodulator of claim 1 wherein the input circuit is operable to invert every other even sample and add the inverted and noninverted even samples to generate the first sum, and is operable to invert every other odd sample and add the inverted and noninverted odd samples to generate the second sum.

51. The method of claim 48 wherein:
  summing the even samples comprises summing the magnitudes of the even samples; and
  summing the odd samples comprises summing the magnitudes of the odd samples for the first servo position burst.

52. The method of claim 48 wherein:
  summing the even samples comprises inverting every other even sample and summing the inverted and noninverted even samples; and
  summing the odd samples comprises inverting every other odd sample and summing the inverted and noninverted odd samples.

* * * * *